(12) United States Patent
Lee

(10) Patent No.: US 7,190,258 B2
(45) Date of Patent: Mar. 13, 2007

(54) ALARM FOR A LIVESTOCK TRAILER AND METHOD OF USE THEREOF

(76) Inventor: Richard Lee, 2565 Eileen Way, Parker, CO (US) 80138

( * ) Notice: Subject to any disclaimer, the term of this patent is extended or adjusted under 35 U.S.C. 154(b) by 107 days.

(21) Appl. No.: 10/970,447

(22) Filed: Oct. 21, 2004

(65) Prior Publication Data
US 2006/0087413 A1    Apr. 27, 2006

(51) Int. Cl.
G08B 21/00    (2006.01)
(52) U.S. Cl. .................. 340/431; 340/453; 340/463; 340/467; 340/479
(58) Field of Classification Search ................ None
See application file for complete search history.

(56) References Cited

U.S. PATENT DOCUMENTS 4,325,052 A * 4/1982 Koerner .................. 340/431
5,030,938 A * 7/1991 Bondzeit ................. 340/431
5,157,591 A * 10/1992 Chudzik .................. 362/486
5,481,243 A * 1/1996 Lurie et al. .............. 340/467
5,890,453 A * 4/1999 Waring-Brown .......... 119/400
5,980,073 A * 11/1999 Whipple .................. 362/485
6,217,200 B1 * 4/2001 Huffman .................. 362/477
6,499,783 B1 * 12/2002 Husted .................. 296/24.31
6,641,288 B1 * 11/2003 Olsen .................... 362/485

FOREIGN PATENT DOCUMENTS

GB    2180417    *    3/1987

* cited by examiner

Primary Examiner—Benjamin C. Lee
Assistant Examiner—Son Tang
(74) Attorney, Agent, or Firm—Leyendecker & Lemire, LLC; Kurt Leyendecker

(57) ABSTRACT

Embodiments of an alarm circuit/device located in a livestock trailer that activates during the braking and/or turning of a trailer and tow vehicle combination is described along with a method of use. Upon activation, livestock in the trailer, such as horses, sheep and cattle, are alerted to further pending deceleration or centrifugal forces and can accordingly brace or otherwise prepare to avoid injury.

19 Claims, 3 Drawing Sheets

ALARM FOR A LIVESTOCK TRAILER AND METHOD OF USE THEREOF

FIELD OF THE INVENTION

This invention generally relates to the transporting of horses and other livestock over the road. More particularly, this invention pertains to an alarm for alerting livestock in a trailer that the trailer is braking and/or decelerating so that the animals can brace.

BACKGROUND

Livestock such as sheep, cattle and horses are routinely transported in trailers attached to trucks. These animals can become injured when the truck and consequently the trailer suddenly decelerates or turns as the animals can be thrown against the sides of the trailer or they lose balance and fall down. To prevent the risk of injury the animal would have to be firmly roped or chained in place to prevent its unintended movement during deceleration and turning. Chaining or roping an animal in place would be very time consuming not to mention potentially cruel to the animal.

Typically, drivers transporting livestock are aware that rapid deceleration and turning can potentially cause injury to their livestock cargo, and accordingly, drivers hauling livestock drive more carefully. However, these drivers cannot control the traffic conditions around them and they may have to brake hard, turn quickly or swerve occasionally depending on the actions of other vehicles on the road. These actions can have deleterious consequences for the livestock they are hauling.

DETAILED DESCRIPTION

Embodiments of an alarm circuit/device for use in a livestock trailer for alerting animals contained in the trailer that braking is eminent so that they may brace or otherwise prepare for the related deceleration forces is described. In one embodiment, the alarm circuit/device is coupled into the brake light circuit of the trailer to activate whenever the brakes of the tow vehicle are applied. In another embodiment, the alarm circuit device includes an accelerometer that actives the alarm whenever the forces related to direction change and/or deceleration exceed a predetermined level.

Typically, the alarm comprises a buzzer or other audible device that alerts the animals to the deceleration, although in variations the buzzer can be supplemented by a visually stimulating device, such as a flasher, or the audible device can be replaced with a visually stimulating device altogether. Animals that are transported in a trailer on a regular basis will learn, after a certain number of repetitions, to associate the activation of the alarm with impending braking or direction change. Accordingly, the animals can brace for the deceleration and avoid or minimize the potential for injury.

Terminology

The term "or" as used in this specification and the appended claims is not meant to be exclusive rather the term is inclusive meaning "either or both".

References in the specification to "one embodiment", "an embodiment", "a preferred embodiment", "an alternative embodiment" and similar phrases mean that a particular feature, structure, or characteristic described in connection with the embodiment is included in at least an embodiment of the invention. The appearances of the phrase "in one embodiment" in various places in the specification are not necessarily all meant to refer to the same embodiment.

The term "couple" or "coupled" as used in this specification and the appended claims refers to either an indirect or direct connection between the identified elements, components or objects. Often the manner of the coupling will be related specifically to the manner in which the two coupled elements interact.

Directional and/or relationary terms such as, but not limited to, left, right, nadir, apex, top, bottom, vertical, horizontal, back, front and lateral are relative to each other and are dependent on the specific orientation of an applicable element or article, and are used accordingly to aid in the description of the various embodiments and are not necessarily intended to be construed as limiting.

The phrase "electrical trace(s)" as used herein refer to any conductive path between two points or locations intended to carry current. Concerning a typical brake light circuit of a trailer, electrical traces typically comprise, but are not limited to, electrical wires.

The term "alarm" as used herein unless otherwise specifically indicated refers to any mechanism designed to alert animals and/or people of something.

A Livestock Trailer According to One Embodiment

Figure 1:
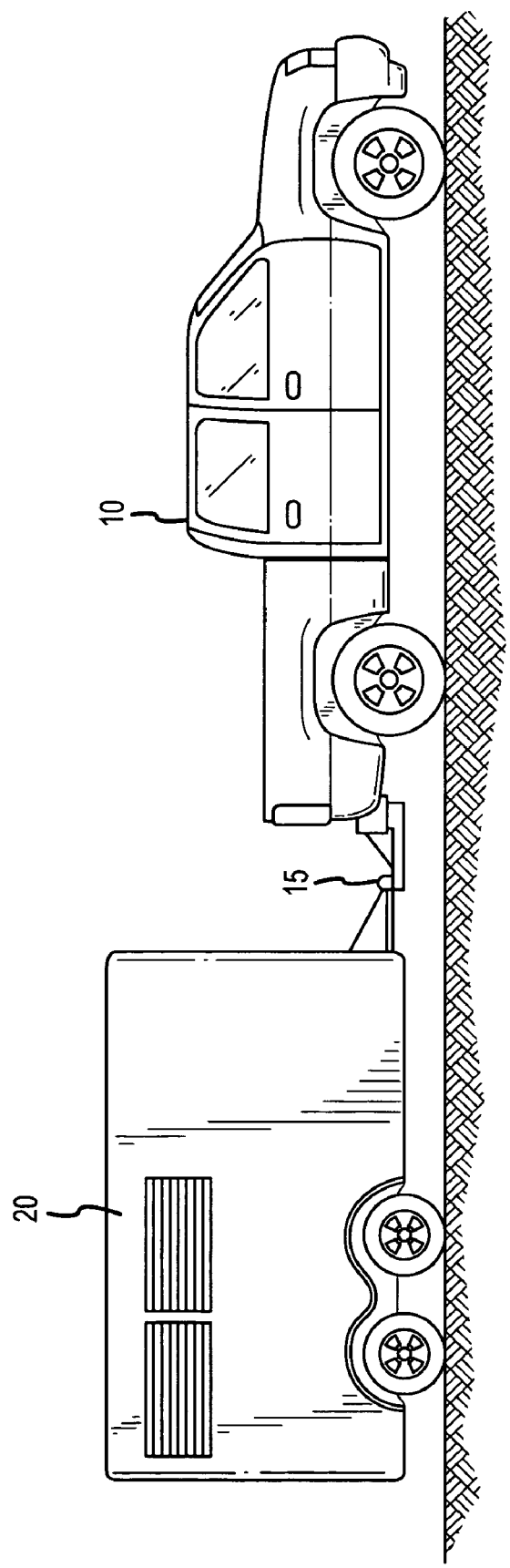
FIG. 1 is an isometric view of a horse trailer coupled with a tow vehicle for transportation of a horse according to one embodiment of the present invention.

Referring to FIG. 1, a horse trailer 20 coupled with a tow vehicle 10 is illustrated. Typically, a small horse trailer designed to carry one or two horses is coupled to the tow vehicle, such as a pickup truck, using a trailer hitch 15. Proximate the trailer hitch, mating electrical connectors are provided on the tow vehicle and the trailer, whereby the brake light circuit of the trailer is operatively coupled with the brake light circuit of the tow vehicle, such that the brake lights of the trailer will illuminate when the driver of the tow vehicle depresses the brake pedal. Additional electrical contacts may also be provided on the connector to couple the lighting systems of the trailer and tow vehicle together and in the case of large trailers, electrical contacts may also be provided to couple the braking system of the tow vehicle with electric brakes on the axels of the trailer.

Larger livestock trailers (not shown), such as those designed to carry a significant number of horses, cattle, pig, sheep or other animals, are often coupled to a tow vehicle at a location in front of the rear axle of the tow vehicle. For instance, a fifth wheel hitch, which is mounted in the bed of a pickup type truck, can be used to couple with larger and heavier trailers. Very large livestock trailers can be adapted for coupling to commercial semi-tractors.

An alarm circuit or device (refer to FIGS. 3 & 4) is located on or within the trailer 20 and is adapted to activate either when the trailer begins to decelerate or the brakes on the tow vehicle are applied. In one variation, the alarm circuit/device comprises a buzzer, a flasher or other notification device that is coupled with the brake light circuit of the trailer to activate when current is flowing through the brake light circuit to illuminate the trailer's brake lights.

In another variation, the alarm device includes an accelerometer that causes the buzzer, flasher or other notification device to activate when the trailer decelerates at a rate greater than a predetermined amount. In this variation, the accelerometer can also be configured to sound when the g-forces related to the turning of the trailer exceeds a predetermined level.

Operationally, embodiments of the alarm equipped trailers are used in a similar manner as traditional prior art trailers. In particular, the trailer is attached to a tow vehicle by way of a suitable hitch. The animals are loaded into the trailer, and the trailer is transported to the desired destination. However, whenever the vehicle begins to decelerate and/or brakes are applied, the alarm is activated to alert the animals in the trailer. In certain variations, the alarm is also activated when the trailer is subjected to g-forces above a certain level during turning.

A Brake Light Circuit of a Trailer According to One Embodiment

Figure 2:
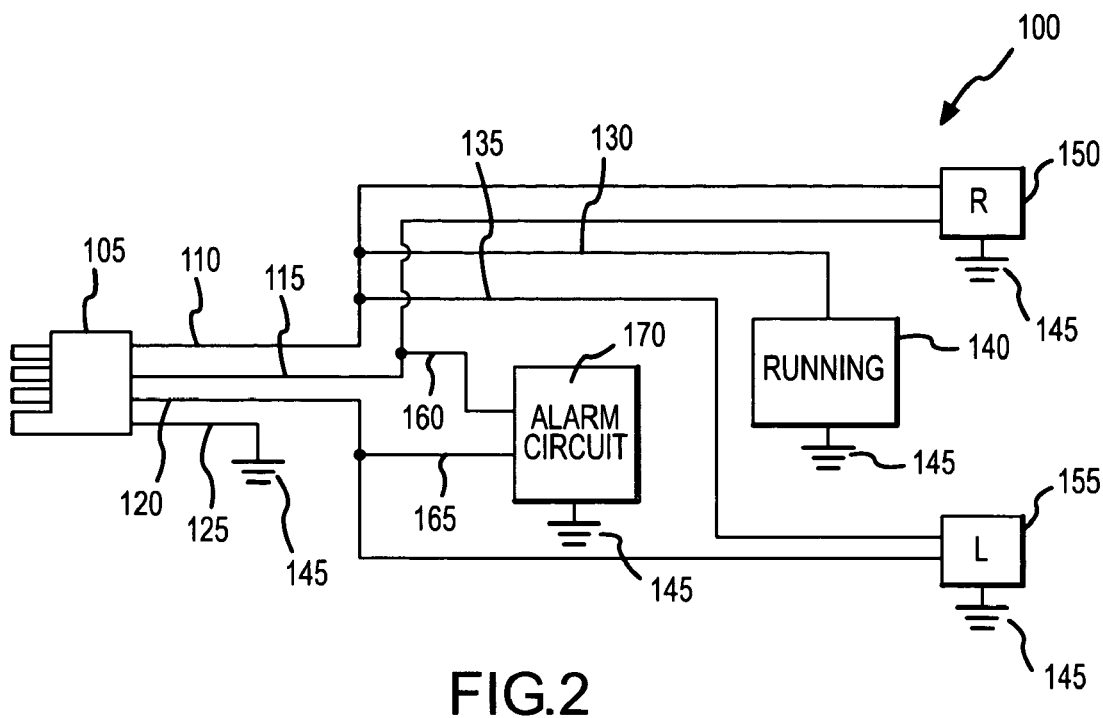
FIG. 2 is schematic of a brake light circuit of a livestock trailer according to one embodiment of the present invention.

Referring to FIG. 2, a brake light circuit 100 of a trailer according to one embodiment is illustrated. The circuit illustrated uses a 4-wire harness. It is, however, to be appreciated that variations of the brake light circuit comprising differing numbers of wires are also possible as would be obvious to one of ordinary skill in the art.

As illustrated four electrical traces 110, 115, 120 & 125 (typically wires) extend from a connector 105. The connector is typically located proximate the trailer hitch and is adapted to couple with a mating connector on the tow vehicle. One electrical trace 110 from which two additional traces 130 & 135 branch provides current to illuminate the trailer's right and left taillights 150 & 155, as well as, the trailer's running lights 140 when the lights of the tow vehicle 10 are activated. The second electrical trace 115 extends from the connector to the right taillight and provides current to the taillight during braking or when the tow vehicle's right turn signal is activated. The third electrical trace 120 extends from the connector to the left taillight and provides current to the taillight during braking or when the tow vehicle's left turn signal is activated. Finally, the fourth electrical trace 125 is coupled with the conductive framework of the trailer as a ground 145. The taillights, the running lights and an alarm circuit/device 170 are all also grounded to the trailer framework.

The alarm circuit device is electrically coupled to both the second and third electrical traces 115 & 120 by way of traces 160 & 165, and is adapted to activate only when current is being supplied through both traces simultaneously. If only one trace has current flowing through it such as when one turn signal is activated, the alarm will not sound. Accordingly, the alarm circuit/device 170 is activated only when the driver depresses the brake pedal in the tow vehicle. Operation of one embodiment of the alarm circuit/device is described below with reference to FIG. 3.

The location of alarm circuit/device in or on the trailer depends on the type of alarm used. For instance, if an audible alarm alone is used, the placement device is not as critical as if a visual alarm is used. In many instances, a visual alarm will not be desirable as all the animals in the livestock trailer may not be able to see a flashing light. In other instances, however, such as when a small 1–2 horse capacity trailer is utilized, a flashing light at the front of the trailer may be a suitable warning for the horse(s). The alarm circuit/device can be attached to the trailer by any suitable means: it can be built into the trailer; it can be clipped onto the trailer; it can be bolted on to the trailer with an integral or separately supplied bracket; and it can be magnetically attached to the vehicle.

An Alarm Circuit According to One Embodiment

Figure 3:
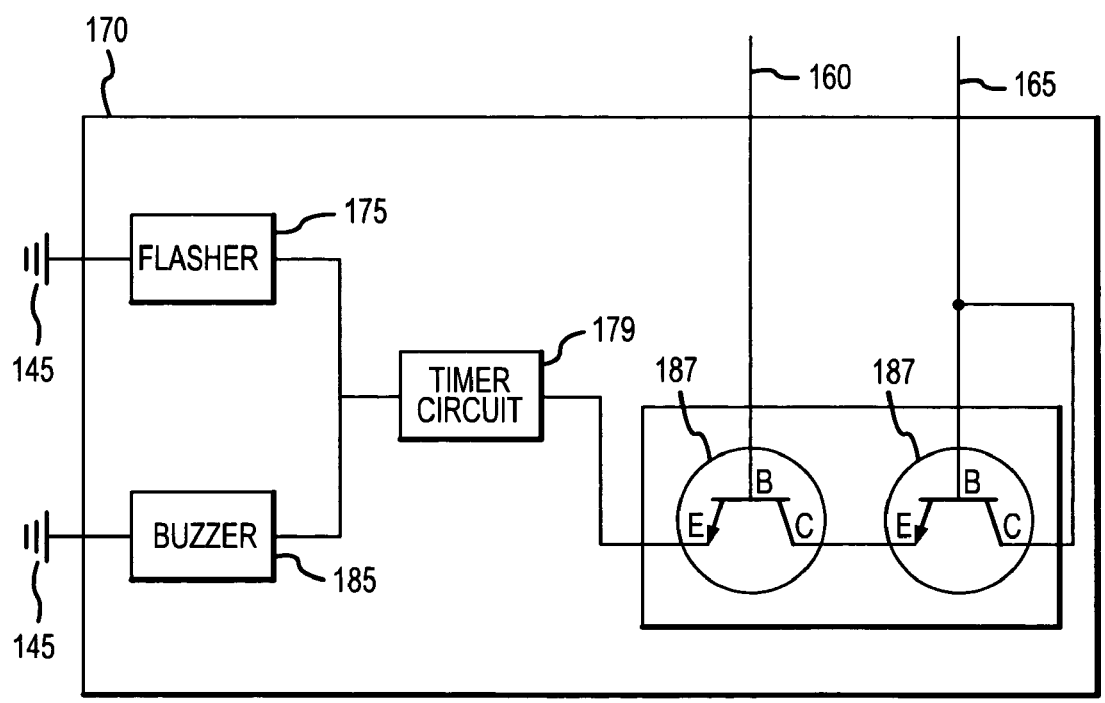
FIG. 3 is schematic of alarm circuit/device according to one embodiment of the present invention.

Referring to FIG. 3, an alarm circuit/device 170 for use with a brake light circuit 100 as described above comprises (i) a buzzer 185 or other audible alarm, (ii) a flasher 175, (iii) an AND gate 180 and (iv) a timer circuit 179. In variations, one or the other of the buzzer and the flasher can be omitted. Further, in other variations, the timer circuit can be omitted. The buzzer and/or flasher are both grounded to the trailer as shown. Power is supplied to the alarm circuit/device from traces 160 & 165 that, as described above, are typically coupled to the respective electrical traces 115 & 120 for the right and left taillights which provide current during braking and turning. Both traces 160 & 165 coupled with the alarm circuit/device are operatively connected to the AND gate.

A simple AND gate 180 is illustrated that includes two NPN transistors 187 wired in series. Each transistor is utilized as an off and on switch that does not permit current flow through its transistor from its collector to the emitter unless current is provided at the transistor's base. The trace 160 from the right taillight is coupled with the base of one transistor and the other trace 165 from the left taillight is coupled to the base of the other transistor. Further, another electrical trace 190 is coupled between either traces 160 & 165 and the collector of the first transistor in the series. If both traces 160 & 165 are electrically coupled to the collector of the first transistor in series, the coupling traces 190 will include a diode wired therein to prevent the reverse flow of current. Absent the diodes, current in any one trace would provide current to both bases and accordingly, activate the flasher and buzzer. When only a single trace is used to couple only one of the traces 160 & 165 to the collector for the first transistor, as shown, a diode is not required. Operationally, each transistor will only permit current to flow from its collector through to its emitter only when current is being supplied to its base. Current will only flow through both transistors when current is being provided to both the left and right taillights simultaneously through electrical traces 115 & 120, such as when the brakes are being applied in the tow vehicle. When current is flowing only through one of the traces 115 & 120, one of the transistors will not permit current flow through it and the buzzer and/or flasher will not sound.

In alternative embodiments and variations of the illustrated embodiment, the AND gate 180 can be replaced with one or more relays that do not permit current flow to the buzzer and/or flasher unless current is flowing in both of traces 115 & 120. A schematic illustrating the configuration of the one or more relays is not illustrated herein but would be obvious to one of ordinary skill in the art given the benefit of this disclosure. As mentioned above, the buzzer 185 can be of any suitable type to warn the livestock in the associated trailer of impending braking. The frequency and pitch of the sound produced by the buzzer may or may not be audible to a human and can be tailored to the particular animal it is intended to alert. The buzzer can be replaced with a speaker or any other sound producing device. Typically, sound is the preferred medium to alert the animals being transported in a trailer as this provides for many more locations in or on the trailer that the buzzer can be placed. Generally, however, it is desirable to place the buzzer in the trailer where it is most likely to not be drowned out be wind and road noise.

The flasher 175 can also be of any suitable type to warn livestock, but will typically comprise a lamp. Although a flashing lamp may be more effective in certain circumstances, a lamp that merely illuminates and does not flash can be used as well. The flasher and/or lamp should be placed where it is perceivable by all of the animals in a particular associated trailer. Because placing a flasher or lamp in a single location can be difficult especially in a trailer, which includes a plurality of compartments, more than one flasher or lamp can be used, or the flasher or lamp can be omitted altogether from variations of the alarm circuit/device that rely wholly on the audible alarm.

In other variations of alarm circuit/device, completely different means of alerting the animal other than visual or audible can be used, such as electro-stimulation. Embodiments of the invention can comprise a single means of alerting the animal or any suitable combination of means.

The timer circuit 179 is used to limit the amount of time that the flasher 175 and/or buzzer 185 is activated after the beginning of braking and/or deceleration by disabling the flow of current to the flasher or buzzer. As can be appreciated, a driver of a tow vehicle will often continue to depress the brake pedal even after the vehicle has been stopped, such as when waiting at a stop light or in traffic. Accordingly, to prevent the alarm from being activated the entire time the brake pedal is depressed, the timer circuits cuts the flow of current to the flasher and/or buzzer a short predetermined amount of after the initial brake application. Further, the timer circuit can include logic that prevents the reactivation of the alarm every time a driver depresses the brake pedal during a single braking event, such as when a driver pumps the brakes. For instance, the timer circuit could be configured to recognize each brake application within a certain period of time, such as but not limited to 10–15 second, as being part of a single braking event and accordingly, prevent the flow of current to the flasher or buzzer.

Figure 5:
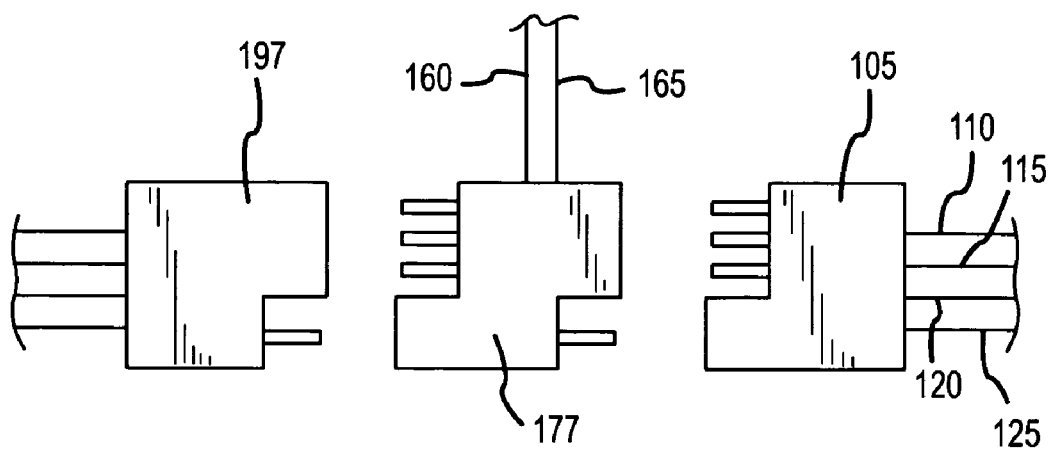
FIG. 5 is an isometric view of an intermediate connector which is electrically coupled to an alarm circuit/device according to one embodiment of the invention.

As illustrated in FIG. 2, the alarm circuit/device 170 is a component of the brake light circuit 100; however, in certain variations, the alarm circuit/device can be separate from the brake light circuit. For instance the traces 160 & 165 can comprise wires that extend between the alarm circuit/device and an intermediate plug receptacle 177 that is shown in FIG. 5. The intermediate plug receptacle is coupled to the brake light circuit of the tow vehicle at the connector typically located proximate the trailer hitch and in turn is coupled to the connector 105 of the trailer. The wires extending from the intermediate plug receptacle are electrically coupled to the prongs or receptacles of the tow vehicle that correspond to the left and right brake light traces. Accordingly, when the brakes are applied in the tow vehicle, the alarm is activated.

An Alarm Circuit According to Another Embodiment

Figure 4:
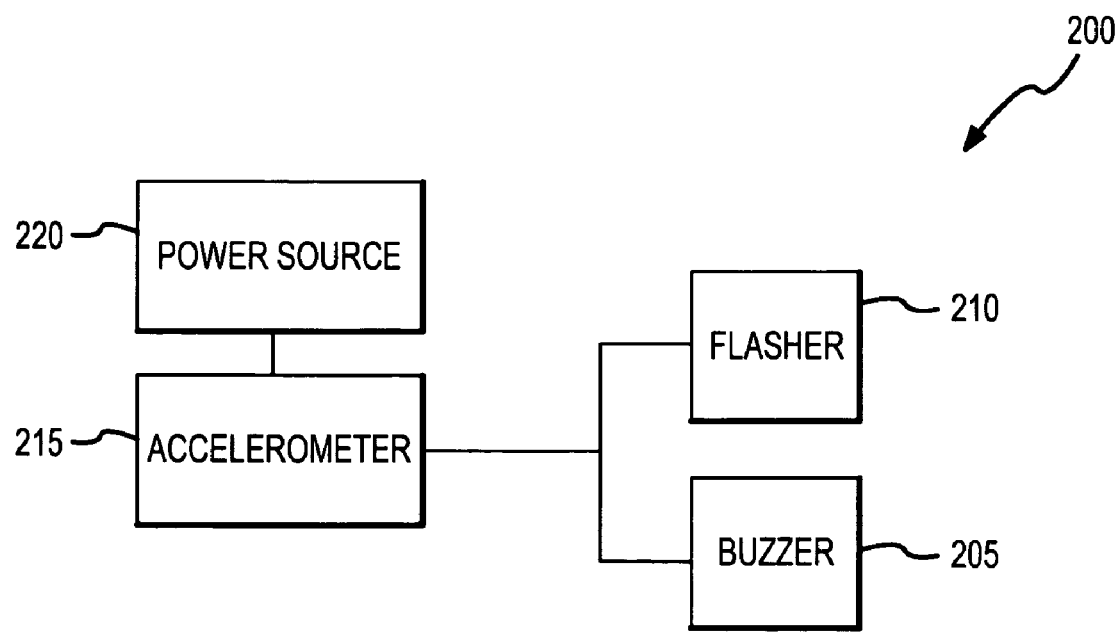
FIG. 4 is a block diagram of another alarm circuit/device according to one embodiment of the present invention.

Referring to FIG. 4, an alarm device 200 that utilizes an accelerometer to determine whether the trailer is decelerating is illustrated. This embodiment comprises (i) the accelerometer 215, (ii) one or both of a flasher 210 and a buzzer 205, and (iii) a power source 220 or electrical traces for coupling to electrical system of the trailer or tow vehicle.

In one variation, the unit is self contained in a housing (not shown) and uses an internal battery power source, such that it can be easily moved between different trailers. Any one of various mounting means can be provided to secure the device to the trailer including but not limited to bracket mounts, straps, and magnets.

The accelerometer is of any suitable type as would be obvious to one of ordinary skill in the art with the benefit of this disclosure. In one variation, the accelerometer is adapted to only measure deceleration along a single axis that corresponds with the normal direction of travel of the trailer. Once the level of deceleration reaches a predetermined threshold, a switch closes in the accelerometer permitting current to travel to either or both of the audible or visual alarms thereby activating them. Preferably, the threshold is low enough that the alarm is activated when braking is just beginning giving the animals sufficient time to brace against the subsequent presumably greater deceleration forces.

In other variations, the accelerometer is adapted to sense deceleration related to turning in addition to braking deceleration. Accordingly, the alarm will active when the centrifugal forces incident on the trailer exceeds a predetermined level. The predetermined level of centrifugal force that will activate the alarm need not be at the same magnitude as the deceleration force needed to activate the alarm during braking. Accordingly, the animals will be alerted that the trailer is beginning to turn even when the tow vehicle begins a turn without first applying the brakes.

Other Embodiments and Other Variations

The various preferred embodiments and variations thereof illustrated in the accompanying figures and/or described above are merely exemplary and are not meant to limit the scope of the invention. It is to be appreciated that numerous variations to the invention have been contemplated as would be obvious to one of ordinary skill in the art with the benefit of this disclosure. All variations of the invention that read upon the appended claims are intended and contemplated to be within the scope of the invention.

For instance, other embodiments incorporating elements of both of the illustrated embodiments are contemplated. The alarm circuit device can be wired into the brake light circuit of the trailer but also include an accelerometer for measuring centrifugal forces related to turning and activating the alarm as necessary. In other variations and embodiments using one or more accelerometers, a means, such as a rotary dial or a slider switch, can be provided so that the user can adjust the level or levels at which the alarm is activated. Embodiments of the invention are not limited to a particular size or type of trailer and can be used with fifth wheels in additional to any type of livestock trailer.

I claim:

1. A livestock trailer comprising:
   a cargo hold adapted to carry livestock; and
   one or more alarms positioned within the cargo hold to be one or both audible and visible to any livestock within the cargo hold when activated, the alarms responsive to and adapted to activate upon detected braking of the trailer.

2. The livestock trailer of claim 1, wherein one or more alarms comprise only audible alarms.

3. The livestock trailer of claim 1, wherein one or more alarms comprise only visual alarms.

4. The livestock trailer of claim 1, wherein the cargo hold is adapted to carry one or more animals.

5. The livestock trailer of claim 1, wherein the one or more alarms are operatively coupled to a brake light circuit of the trailer with activation of a brake light of the trailer also activating the one or more alarms.

6. The livestock trailer of claim 1 wherein (a) the brake light circuit includes: (i) at least one connector adapted to couple with at least one mating connector of a tow vehicle, (ii) a first electrical trace extending to a first brake light, (iii)

a second electrical trace extending to a second brake light, and (iv) the first and second brake lights; and (b) the one or more alarms are electrically coupled to activate only when current is supplied to both the first and second traces.

7. The livestock trailer of claim 1, further comprising an accelerometer operatively coupled to the one or more alarms wherein accelerometer activates the one or more alarms when the trailer begins to decelerate.

8. A brake light circuit of a livestock trailer, the braking circuit comprising:
   one or more brake lights;
   an electrical connector adapted to connect with a tow vehicle's brake light circuit;
   one or more electrical traces extending from the connector to the one or more brake lights; and
   at least one audible alarm positioned within the livestock trailer to be perceptible by the livestock and electrically coupled to the electrical traces and adapted to sound upon activation of the one or more brake lights.

9. The brake circuit of claim 8, wherein the electrical traces comprise electrical wires.

10. The brake circuit of claim 8, further comprising at least one visual alarm.

11. The brake circuit of claim 8, wherein: (i) the one or more brake lights comprises a left and a right brake light; (ii) the one or more electrical traces comprises a left trace extending from the electrical connector to the left brake light and a right trace extending from the electrical connector to the right brake light; and (iii) the at least one audible alarm includes an activation circuit adapted to permit the audible alarm to sound only when both the left and right brake lights are activated.

12. The brake light circuit of claim 11, wherein the activation circuit includes an And gate.

13. The brake light circuit of claim 11, wherein the activation circuit includes a relay.

14. The brake light circuit of claim 11, wherein the activation circuit further includes a timing circuit.

15. A method of transporting an animal in a livestock trailer, the method comprising:
   attaching a livestock trailer to a tow vehicle;
   placing an animal in the livestock trailer;
   driving the tow vehicle and pulling the livestock trailer;
   automatically activating one or more alarms located within the livestock trailer immediately prior to or upon detected braking of the tow vehicle to be perceptible by the animal.

16. The method of claim 15, wherein the alarm is an audible alarm.

17. The method of claim 15, wherein the alarm is automatically activated concurrently with activation of one or more brake lights of the tow vehicle.

18. The method of claim 15, wherein the alarm further includes an accelerometer, the accelerometer adapted to activate the alarm when a de-acceleration g-force of the livestock vehicle exceeds a predetermined level.

19. The method of claim of claim 18, wherein the accelerometer is further adapted to activate the alarm when the g-force generated during the turning of the livestock trailer exceeds a predetermined level.

* * * * *